United States Patent
Ban (10) Patent No.: US 8,520,779 B2
(45) Date of Patent: Aug. 27, 2013

(54) METHOD AND APPARATUS FOR AUDIO NOISE REDUCTION OF FREQUENCY MODULATION (FM) RECEIVER

(75) Inventor: Jae-jun Ban, Seongnam (KR)

(73) Assignee: FCI Inc., Gyeonggi-do (KR)

( * ) Notice: Subject to any disclaimer, the term of this patent is extended or adjusted under 35 U.S.C. 154(b) by 210 days.

(21) Appl. No.: 13/196,889

(22) Filed: Aug. 3, 2011

(65) Prior Publication Data

US 2012/0033764 A1  Feb. 9, 2012

(30) Foreign Application Priority Data

Aug. 3, 2010  (KR) .................. 10-2010-0074955

(51) Int. Cl.
*H03D 3/24* (2006.01)
(52) U.S. Cl.
USPC .......................................... 375/327; 375/346
(58) Field of Classification Search
USPC ...................... 375/326, 327, 340, 278, 346
See application file for complete search history.

(56) References Cited

U.S. PATENT DOCUMENTS

| | | | |
|---|---|---|---|
| 6,697,098 B1 * | 2/2004 | Wang | 348/21 |
| 7,809,066 B2 * | 10/2010 | Bouillet et al. | 375/240.27 |
| 2003/0007575 A1 * | 1/2003 | Ohishi | 375/326 |
| 2004/0109092 A1 * | 6/2004 | Markman et al. | 348/726 |
| 2005/0226339 A1 * | 10/2005 | Bouillet et al. | 375/240.27 |

* cited by examiner

*Primary Examiner* — Emmanuel Bayard (57) ABSTRACT

A method and an apparatus for audio noise reduction of frequency modulation (FM) receiver are described. After receiving FM signal having pilot tone, pilot carrier sync detector performs pilot carrier synchronization detection of FM signal, FM demodulator demodulates synchronized FM signal, multiplex decoder decodes audio signal of demodulated FM signal for outputting the decoded audio signal, and noise reduction controls multiplex decoder for controlling noise attenuation associated with the decoded audio signal according to RSSI, the method comprising the steps: (a) performing phase error detection for detecting phase error of phase-locked loop (PLL) of pilot carrier sync detector; (b) determining whether noise exists by comparing the phase error with threshold value to determine whether noise exists in the phase error; and (c) performing noise reduction step by outputting noise reduction control signal to noise reduction based on determination in step (b) for reducing noise in the noise existence interval.

15 Claims, 9 Drawing Sheets

METHOD AND APPARATUS FOR AUDIO NOISE REDUCTION OF FREQUENCY MODULATION (FM) RECEIVER

FIELD OF THE INVENTION

The present invention relates to a method and apparatus for audio noise reduction of frequency modulation (FM) receiver, and more particularly relates to a method and apparatus which employs the phase error of pilot carrier sync phase-locked loop (PLL) for detecting noise in order to eliminate audio noise in a FM receiver.

BACKGROUND OF THE INVENTION

Currently, there are many kinds of methods for detecting noise of FM receiver in the prior art. These methods include an estimation manner to be served as a detection reference standard such as a received signal strength indication (RSSI), a manner for measuring the abrupt change of the time domain shape after observing the time domain shape of audio signal in high-pass filter (HPF) or low-pass filter (LPF), and a manner for detecting the noise by determining whether the signal level of L (left)-R (right) audio signal is greater than the signal level of L+R audio signal.

Figure 1:
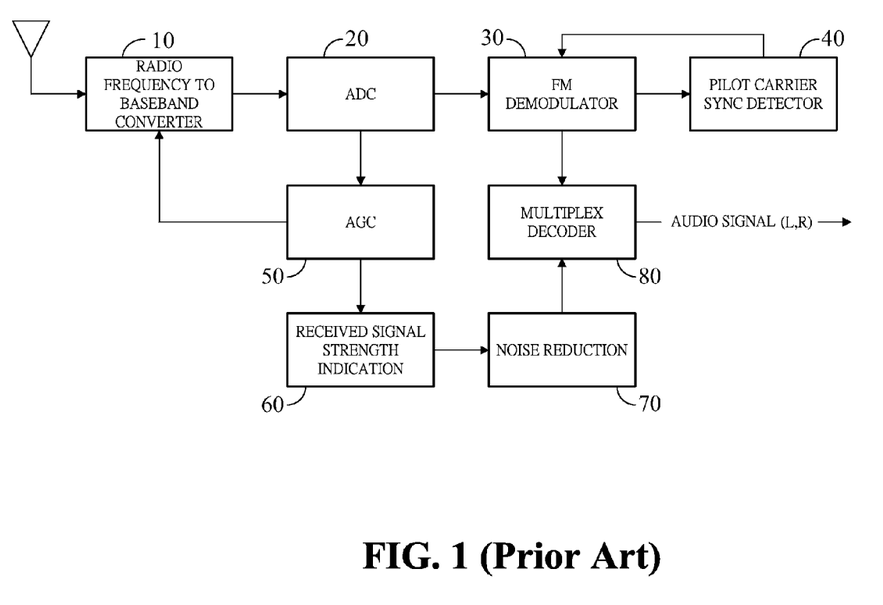
FIG. 1 illustrates a conventional frequency modulation (FM) digital receiver.
Figure 2:
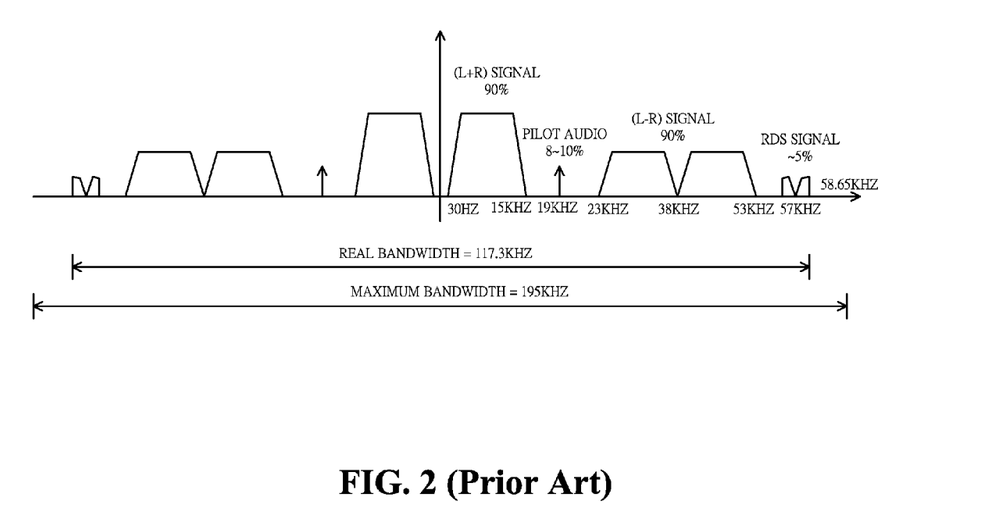
FIG. 2 illustrates the characteristic of band domain in conventional FM radio signal.

As shown in FIG. 2, a pilot tone is inserted to 19 kHz of baseband domain with respect to FM radio signal. FIG. 2 illustrates the characteristic of band domain in FM radio signal. FIG. 1 shows a conventional FM digital receiver.

As shown in FIG. 1, FM digital receiver includes a radio frequency to baseband converter 10 for detecting the baseband signal of the radio signal received from the antenna, an analog-to-digital converter (ADC) 20 for converting the output signal of radio frequency to baseband converter 10 into the digital signal, an automatic gain control (AGC) 50 for controlling the gain of radio frequency to baseband converter 10 after receiving the received data from ADC 20, received signal strength indication 60 for indicating RSSI based on gain control value of AGC 50, FM demodulator 30 for demodulating the output signal of ADC 20, a pilot carrier sync detector 40 for controlling the frequency synchronization of FM demodulator 30 after the pilot carrier sync signal in FM demodulator 30 is detected, a noise reduction 70 for controlling noise decay of the output signal of the received signal strength indication 60, and a multiplex (MPX) decoder 80 for decoding the modulated data from the FM demodulator 30 for outputting L and R audio signal after the noise reduction 70 reduces the noise.

The FM digital receiver performs FM modulation and detects the pilot tone for executing frequency sync to separate L+R audio signal from L-R audio signal in order to generate L and R audio signal.

Meanwhile, the feature of FM receiving/transmitting is that the L-R audio signal is insensitive to noise. When an audio noise reduction is employed, received signal strength indication (RSSI) is adopted to reduce noise of L-R audio signal, which is termed as Stereo Noise Cancellation (SNC) technique or Soft Stereo Blending (SBL).

Furthermore, while employing received signal strength indication (RSSI), high frequency audio is processed according to high frequency cut based on RSSI, or L-R, L+R, L or R audio signals is processed by a mute processing. However, such the above-mentioned manners of noise reduction will result in distortion of audio signal. Therefore, it is required to precisely determine whether noise exists or not before SNC, HCC (high cut control), and Mute are adopted, which are described as follows.

(1) SNC type—Stereo signal is converted to Mono signal.
(2) HCC type—High frequency signal is reduced.
(3) Mute type—Audio signal is processed by mute processing.

According to the above-mentioned descriptions, RSSI is employed by FM receiver. Because FM receiver has intrinsic thermal noise, signal-to-noise (SNR) is enlarged while RSSI is increased and signal-to-noise (SNR) is reduced while RSSI is decreased. However, the problems of employing RSSI are that the several noise patterns including multipath fading and impulse interference cannot be solved.

It is ineffective to measure the abrupt change of the time domain shape after observing the time domain shape of audio signal in high-pass filter (HPF) or low-pass filter (LPF). The concept of such the manner is that the abrupt change of basic shape of audio signal is detected and determines whether the noise exists when single tone audio signal is inputted. However, the audio signal is not only composed of single tone audio but a plurality of frequency bands. Further, the time domain shape is not standard type so that such the manner cannot be utilized.

While determining whether the signal level of L (left)-R (right) audio signal is greater than the signal level of L+R audio signal for the noise detection, which employs the feature of FM receiving/transmitting, the noise effect is gradually increased when frequency raises even if a flat noise, e.g. Additive White Gaussian Noise (AWGN), exists in full frequency band. That the signal level of L-R audio signal is greater than the signal level of L+R audio signal seldom is a rare situation. The reason is that audio signal tends to mono type, even the stereo type, so that "L" and "R" signals cannot be totally separated according to the audio intrinsic characteristic.

Therefore, although the enlarged noise can be detected when the signal level of L (left)-R (right) audio signal is greater than the signal level of L+R audio signal, however, the problem is that the enlarged noise cannot be identified before user listens to the enlarged noise which user feels uncomfortable.

SUMMARY OF THE INVENTION

One objective of the present invention is to provide a method and apparatus for detecting noise in order to eliminate audio noise, including SNC type, HCC type and Mute type of noise, in a FM receiver.

The present invention sets forth a method and apparatus which employs the phase error of pilot carrier sync phase-locked loop (PLL) for detecting noise in order to eliminate audio noise in a FM receiver. The several noise patterns including Additive White Gaussian Noise (AWGN), multipath fading and impulse interference can be solved and facilitates SNC type and HCC type.

According to the above objective, the present invention sets forth a method for audio noise reduction of frequency modulation (FM) receiver, wherein after receiving a FM signal having a pilot tone, a pilot carrier sync detector performs a pilot carrier synchronization detection of the FM signal, a FM demodulator demodulates the synchronized FM signal, a multiplex decoder decodes an audio signal of the demodulated FM signal for outputting the decoded audio signal, and a noise reduction controls the multiplex decoder for controlling noise attenuation associated with the decoded audio signal according to RSSI, the method comprising the steps of:

(a) performing a phase error detection for detecting the phase error of phase-locked loop (PLL) of the pilot carrier sync detector;

(b) determining whether noise exists by comparing the phase error with a threshold value to determine whether the noise exists in the phase error; and (c) performing a noise reduction step by outputting a noise reduction control signal to the noise reduction based on the determination in step (b) for reducing the noise in the noise existence interval.

During the step (c), one of absolute average value of phase error, absolute peak value of phase error, absolute average peak value of phase error and power level of phase error based on noise detection mode is detected and the detected phase error is compared with threshold value for determining whether noise exists.

The threshold value is processed by a hysteresis manner and when status flags of the noise reduction control signal turn on/off, a plurality of different threshold values are used in the status flags, respectively. During the step (c), when status flags of the noise reduction control signal turn on/off, a confidence counter allows the status flag to be changed during a predetermined continuous time interval.

The apparatus for audio noise reduction of frequency modulation (FM) receiver comprises a phase error, detecting the phase error of the PLL of the pilot carrier sync detector; and a noise reduction unit, outputting a noise reduction control signal to the noise reduction for reducing the noise in a noise existence interval.

The noise reduction further comprises a NIPE detecting unit, a threshold setting unit and a noise detection unit. The NIPE detecting unit generates noise indicator by phase error (NIPE) by computing one of a absolute value averaging operation unit of the phase error, a peak value operation unit of the phase error, a peak value averaging operation unit of the phase error, and a power level average and performing selection based on a noise detection mode. The threshold setting unit configures a threshold value for comparing the threshold value with the NIPE to determine whether the noise exists or not. The noise detection unit outputs a noise reduction control signal to the noise reduction unit after comparing the threshold value with the NIPE to determine whether the noise exists or not.

The noise reduction controller further comprises a hysteresis control unit, comparing NIPE signal with the threshold signal by noise detection unit based on the based on threshold signal from the threshold setting unit to generate noise reduction control signal wherein the threshold signal is further processed by hysteresis operation. The noise reduction controller further comprises a confidence counter and when the noise detection unit generates the noise reduction control signal, the state of noise reduction control signal changes and the state change keeps in a predetermined time interval, the noise reduction control signal is generated.

In comparison with conventional RSSI, the present invention is capable of detecting multi-path fading or the situations which RSSI cannot detects and thus reduces the noise in FM audio signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 3:
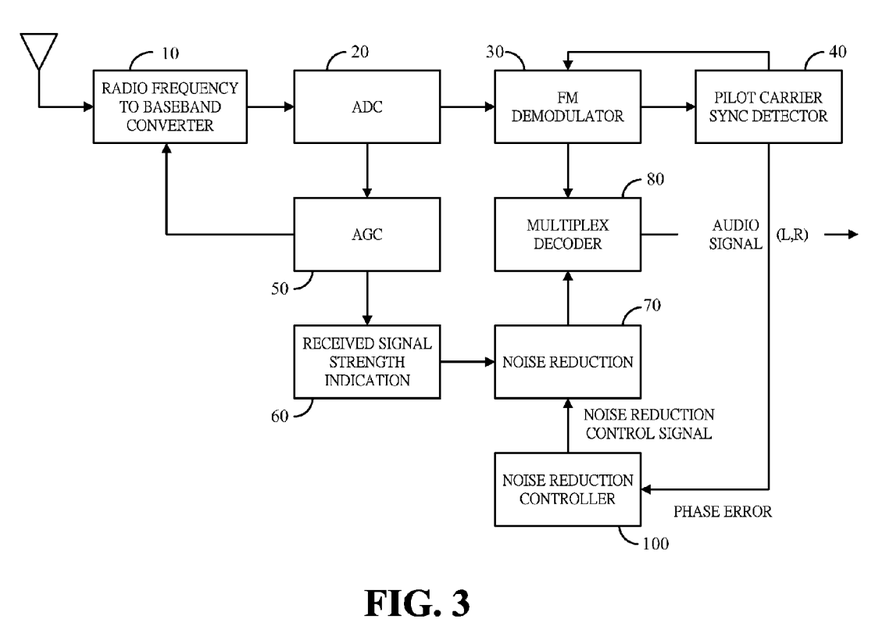
FIG. 3 illustrates an apparatus for audio noise reduction of FM receiver according to one embodiment of the present invention.

FIG. 3 illustrates an apparatus for audio noise reduction of frequency modulation (FM) receiver according to one embodiment of the present invention. As shown in FIG. 3, FM digital receiver includes a radio frequency to baseband (RF-BB) 10, an analog-to-digital converter (ADC) 20, an automatic gain control (AGC) 50, a received signal strength indication 60, a FM demodulator 30, a pilot carrier sync detector 40, a noise reduction 70, and a multiplex (MPX) decoder 80.

The radio frequency to baseband (RF-BB) converter 10 detects the baseband signal of the radio signal received from the antenna. The analog-to-digital converter (ADC) 20 converts the output signal of radio frequency to baseband converter 10 into the digital signal. The automatic gain control (AGC) 50 controls the gain of radio frequency to baseband converter 10 after receiving the received data from ADC 20. The received signal strength indication 60 is used to indicate RSSI based on gain control value of AGC 50. The FM demodulator 30 demodulates the output signal of ADC 20. The pilot carrier sync detector 40 controls the frequency synchronization of FM demodulator 30 after the pilot carrier sync signal in FM demodulator 30 is detected. The noise reduction 70 controls the noise decay of the output signal of the received signal strength indication 60. The multiplex (MPX) decoder 80 is used to decode the modulated data from the FM demodulator 30 for outputting L and R audio signal after the noise reduction 70 reduces the noise.

As shown in the above-mentioned FM receiver, after receiving the pilot tone and the FM signal, the pilot carrier sync detector 40 detects the carrier synchronization and FM demodulator 30 demodulated the synchronized frequency signal so that the multiplex (MPX) decoder 80 decoder demodulated frequency for outputting audio signal. Based on the signal intensity from the received signal strength indication 60, the noise reduction 70 controls the multiplex (MPX) decoder 80 for handling noise reducing process.

In the present invention, FM receiver with audio noise reduction further includes the phase error and the noise reduction controller 100. The phase error of phase-locked loop PLL) is employed by pilot carrier sync detector 40 and the noise reduction controller 100 for controlling the noise reduction 70 according to phase error and noise detected result.

Figure 4:
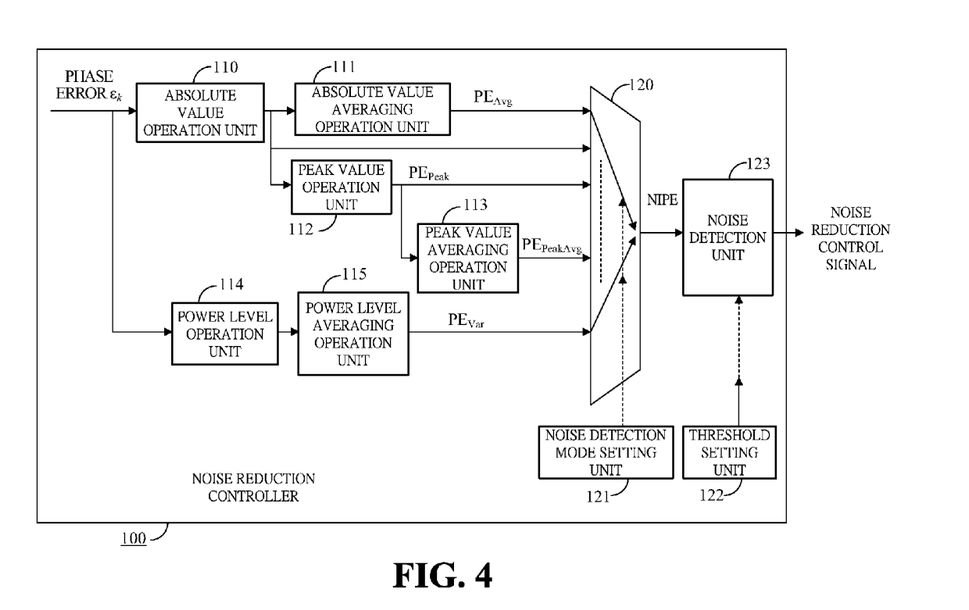
FIG. 4 illustrates a detailed block diagram of noise reduction controller according to one embodiment of the present invention.

The noise reduction controller 100 includes following components:

The noise indicator by phase error (NIPE) detecting unit computes NIPE from one of the absolute value averaging operation unit 111 of phase error, peak value operation unit 112 of phase error, peak value averaging operation unit 113 of phase error, and power level average to form noise indicator by phase error (NIPE) and performs selection based on noise detection mode.

A threshold setting unit 122 set a threshold value to be compared with NIPE to determine whether the noise exists or not.

A noise detection unit 123 is used to compare the threshold value with NIPE and outputs a noise reduction control signal to noise reduction 70 after identifying the noise existence.

The noise indicator by phase error (NIPE) detecting unit includes:

An absolute value operation unit 110 is used to compute the absolute value of phase error detected by the PLL of pilot carrier sync detector 40.

The absolute value averaging operation unit 111 is used to compute the output average $PE_{Avg}$ of absolute value operation unit 110.

The peak value operation unit 112 is used to computes the peak value $PE_{Peak}$ of absolute value operation unit 110 during a predetermined time interval.

The peak value averaging operation unit 113 is used to compute the output average $PE_{PeakAvg}$ of peak value operation unit 112.

The power level operation unit 114 of phase error is used to compute phase error squared for forming the power level.

The power level averaging operation unit 115 of phase error is used to compute the average $PE_{Var}$ of the power level operation unit 114.

A noise detection mode setting unit 121 is used to set the noise detection mode by selecting one value from absolute average value of absolute value averaging operation unit 111, the peak value of peak value operation unit 112, the absolute peak value of peak value averaging operation unit 113, and the power level output of phase error in power level averaging operation unit 115.

A noise indication selection unit of phase error 120 is used to select one from absolute average value of absolute value averaging operation unit 111, the peak value of peak value operation unit 112, the absolute peak value of peak value averaging operation unit 113, and the power level output of phase error in power level averaging operation unit 115 according to the noise detection mode by the noise detection mode setting unit 121 to be served as noise indicator by phase error (NIPE).

The threshold setting unit 122 set the threshold values as fixed threshold values based on the noise detection mode.

In another case, the present invention utilizes the pilot carrier level rate, demodulator level and the weight of stereo audio signal for setting the threshold value as adjustable threshold value.

Figure 5:
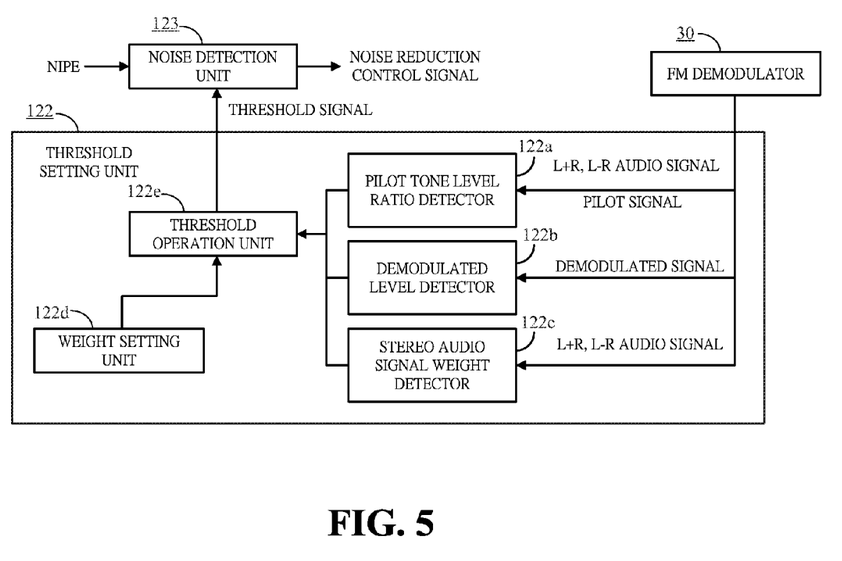
FIG. 5 illustrates a detailed block diagram of threshold setting unit for setting the threshold value to an adjustment threshold value according to one embodiment of the present invention.

FIG. 5 illustrates a detailed block diagram of threshold setting unit 122 for setting the threshold value to an adjustment threshold value according to one embodiment of the present invention. As shown in FIG. 5, threshold setting unit 122 include pilot tone level ratio detector 122a for detecting the pilot tone level ratio according to "L+R" audio signal, "L−R" audio signal and pilot tone level signal demodulated from FM demodulator 30, demodulated level detector 122b for detecting the level of demodulated signal from FM demodulator 30, stereo audio signal weight detector 122c for detecting the stereo audio weight based on the "L+R" audio signal, "L−R" audio signal from FM demodulator 30, weight setting unit 122d for setting weight value to facilitate noise reduction, and threshold operation unit 122e for computing the weight value, pilot tone level rate, demodulated signal level, and stereo audio weight to generate threshold signal and output the threshold signal to the noise detection unit 123.

Figure 6:
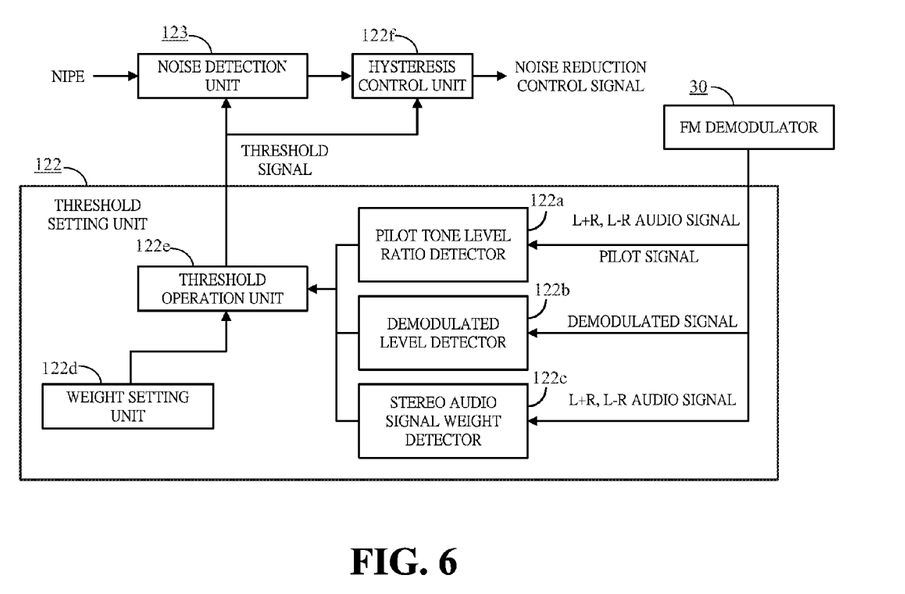
FIG. 6 illustrates a schematic view of noise reduction controller with a hysteresis controller manner according to one embodiment of the present invention.

Additionally, the present invention utilizes hysteresis manner of threshold signal to perform stable noise reduction. FIG. 6 illustrates a schematic view of noise reduction controller 100 with a hysteresis controller manner according to one embodiment of the present invention.

As shown in FIG. 6, noise reduction controller 100 further includes a hysteresis control unit 122f for comparing NIPE signal with the threshold signal by noise detection unit 123 based on the based on threshold signal from the threshold setting unit 122 to generate noise reduction control signal wherein the threshold signal is further processed by hysteresis operation.

Furthermore, such the situation is termed as state change and the noise reduction control signal is generated if the shorter time interval is a predetermined interval when state changes during the shorter time interval with respect to the noise detection of the present invention.

Figure 7:
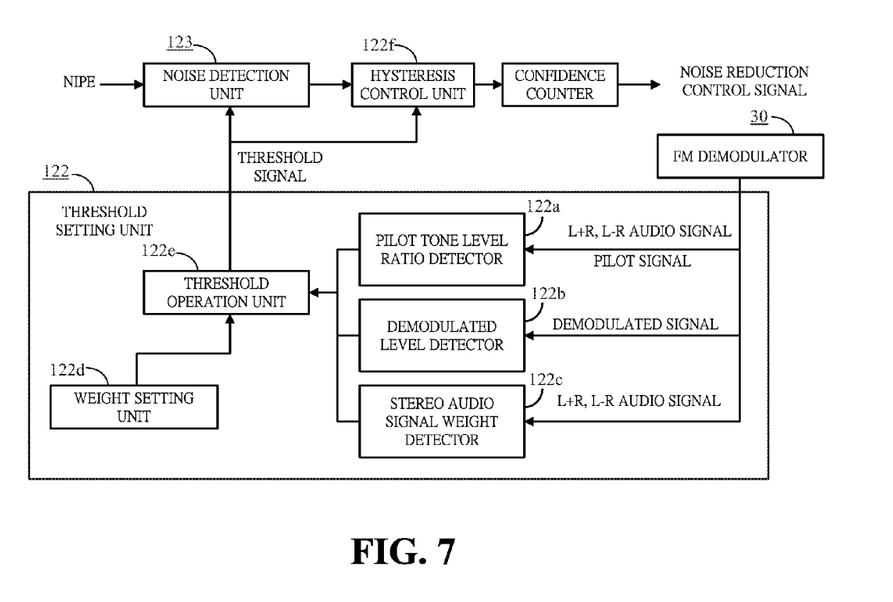
FIG. 7 illustrates a schematic view of noise reduction controller with a confidence counter according to one embodiment of the present invention.

FIG. 7 illustrates a schematic view of noise reduction controller 100 with a confidence counter 122g according to one embodiment of the present invention.

As shown in FIG. 7, noise reduction controller 100 further includes a confidence counter 122g. When the noise detection unit 123 generates the noise reduction control signal, the state of noise reduction control signal changes and the state change keeps in a predetermined time interval, the noise reduction control signal is generated. In one case, the confidence counter 122g is positioned after the hysteresis control unit 122f. In another case, the confidence counter 122g is positioned after the noise detection unit 123 and the hysteresis control unit 122f is omitted.

The feature of noise reduction 70 is that one of setting mode including SNC type, HCC type and Mute type is selected and the noise reduction 70 controls the turn-on/turn-off of the selected setting mode based on NIPE signal. The noise reduction controller 100 for controlling the noise reduction 70 may be software to perform control processes. In another case, the noise reduction controller 100 may be additional control function block. In addition, based on the output of the noise reduction 70, the demodulated audio signal inputted to MPX decoder 80 is controlled by noise reduction control, the demodulated audio signal is performed by noise reduction using software manner, or cut-off the corresponding signal in a noise reduction mode by switching on/off filter.

Figure 8:
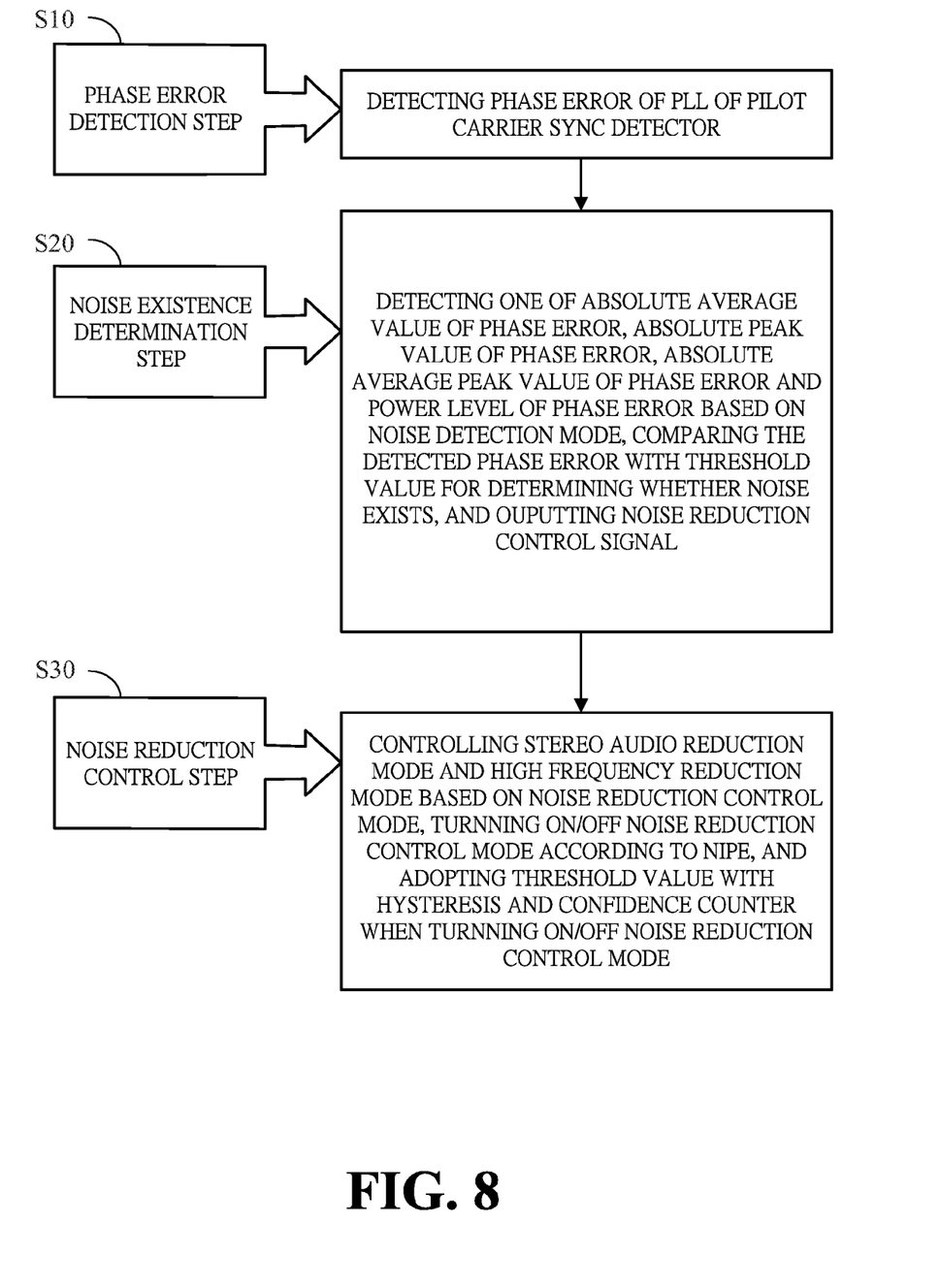
FIG. 8 is a flow chart of noise reduction control method in the FM receiver according to one embodiment of the present invention.

FIG. 8 is a flow chart of noise reduction control method in the FM receiver 100 according to one embodiment of the present invention. As shown in FIG. 8, FM receiver 100 performs the noise reduction control method. The method includes the following steps.

In step S10, a phase error detection is performed for detecting the phase error of PLL of pilot carrier sync detector 40.

In step S20, a determination of whether the noise exists is performed. The phase error is compared with threshold value to determine whether noise exists in phase error.

In step S30, a noise reduction is performed. A noise reduction control signal is outputted to the noise reduction 70 based on the noise determination in step S20 for reducing the noise in identified interval.

During the step S20 of determining whether the noise exist, based on noise detection mode, one of absolute average value of phase error, absolute peak value of phase error, absolute average peak value of phase error and power level of phase error is detected and the detected phase error is employed in threshold value to determine whether noise exists.

The present invention detects the pilot carrier level rate, demodulator level (DEMOD) and the weight of stereo audio signal for adjusting the threshold of noise detection.

Absolute value or power level is used to compute the pilot tone level ratio and/or demodulator level.

When the status flag of noise reduction signal turns-on/turns-off, different threshold values are used in turns-on/turns-off situations, respectively. That is, the threshold value is processed by hysteresis manner to increase the stability.

When the status flag of noise reduction signal turns-on/turns-off, a confidence counter is utilized and the status flag forms state change during a specific continuous interval to provide preferred stability.

The pilot carrier sync detector 40 utilizes the phase error of PLL to determine whether noise exists before controlling noise reduction. The phase error detected by the pilot carrier sync detector 40 serves as the corresponding index of SNR. FIG. 4 illustrates a detailed block diagram of noise reduction controller according to one embodiment of the present invention. One of absolute average value of phase error, absolute peak value of phase error, absolute average peak value of phase error and power level of phase error is selected on the basis of the noise detection mode to determine NIPE.

While computing absolute average value of phase error, computes the absolute value of phase error of absolute value operation unit 110 and the absolute value averaging operation unit 111 computes the absolute average value of phase error by receiving the absolute value of phase error from the output average of absolute value operation unit 110.

The "positive" and "negative" signs of phase error cane be ignored by taking absolute value.

While performing average operation, the following manners can be performed:

Block average by integrate and dump structure;

Moving window average; and

Filter like alpha-tracker using Infinite Impulse Response (IIR) filter.

The absolute value operation unit 110 and peak value operation unit 112 compute the absolute peak value of phase error.

While calculating peak of phase error, a peak value in a predetermined time interval is outputted.

In addition, the absolute value operation unit 110, peak value operation unit 112 and the peak value averaging operation unit 113 compute absolute peak average value of phase error.

Moreover, the power level operation unit 114 and the power level averaging operation unit 115 compute the power level (variance), $PE_{Var}$. Specifically, after the phase error is squared, the squared value is averaged to form the power level.

According to the above-mentioned method, data value can be updated during a specific time interval. While employing IIR filter, coefficients are used to determine the weight value of current data.

The method of computing power level is easily performed. Additionally, because PLL has the convergence feature, the method of peak computation is capable of detecting the noise.

The pilot carrier sync detector 40 detects noise according to the phase error. Moreover, even if SNR can be precisely detected, the pilot carrier sync detector 40 still can detects whether the noise level is greater than a predetermined level.

The following descriptions will indicate that the pilot carrier sync detector 40 employs phase error to generate NIPE and identify noise level to be applied to FM stereo decoder.

In this case, the FM stereo decoder performs audio decoding to evaluate and set the stereo audio signal weight and/or determine whether the mode of high frequency cut is turned-on or not.

When NIPE is directly used, the frequency deviation and the power of pilot frequency are increased based on the FM characteristic so that the power level of absolute error is enlarged. For example, based on the feature of band-pass filter for filtering 19 kHz, the adjacent signal cannot be eliminated. When the audio signal in 15 kHz is modulated by FM into "L+R" and "L−R", pilot frequency is mixed to increase NIPE because the operation condition of band-pass filter in 19 kHz is not enough sharp.

NIPE is normalized to increase the precision of noise detection.

$THNIPE=\alpha NIPE \times$(Pilot Level Ratio)$\times$(Demod Level$\times$Stereo Degree), Noise detection, when $NIPE>=THNIPE$, $LpR$ Level$=AVG\{abs$("$L+R$" signal's FM demodulated output)$\}$ or $AVG\{($"$L+R$" signal's FM demodulated output$)^2\}$;

$LmR$ Level$=AVG\{abs$("$L-R$" signal's FM demodulated output)$\}$ or $AVG\{($"$L-R$" signal's FM demodulated output$)^2\}$;

Pilot level ratio$=AVG\{abs$(Pilot signal's FM demodulated output)$\}$ or $AVG\{$(Pilot signal's FM demodulated output$)^2\}$;

Demod Level$=AVG\{abs$(FM demodulator output)$\}$ or $AVG\{$(demodulator output$)^2\}$;

$\alpha NIPE=$Pre-defined $NIPE$, weighting value;

Pilot Level Ratio=(Pilot Level)÷($LpR$ Level+$LmR$ Level); and

Stereo Degree=($LpR$ Level+$LmR$ Level)÷($LpR$ Level)  formula (1)

That is, threshold value (THNIPE) is equal to the multiplication of predetermined weighting value ($\alpha$NIPE), pilot level ratio, DEMOD level and stereo degree and is adjusted. After comparing the adjusted threshold value (THNIPE) with the NIPE, noise exists when noise reduction control signal is greater than threshold value and noise reduction is performed.

As shown in FIG. 5, pilot tone level ratio detector 122a of threshold setting unit 122 detects the pilot tone level ratio based on "L+R" audio signal, "L−R" audio signal, and pilot tone level signal of FM demodulator 30.

"LpR" level of "L+R" audio signal can be obtained from FM demodulator for computing the absolute average value of "L+R" audio signal. In other case, "L+R" audio signal is squared to compute the power level of "L+R" audio signal. Similarly, "LmR" level of "L−R" audio signal is suitable for above rule.

Pilot level can be obtained by detecting the pilot signal of demodulated signal from FM demodulator to evaluate absolute average value, or by detecting the average value of squared pilot signal, i.e. power level of pilot signal). Then, "LpR" level of "L+R" audio signal, "LmR" level of "L−R" audio signal and pilot level are used to compute the pilot level ratio.

Furthermore, based on FM demodulated signal of FM demodulator 30, demodulated level detector 122b detects the level of FM demodulator 30. In another case, absolute average value outputted from the FM demodulator 30 and the average value of squared outputted signal from FM demodulator 30 are used to detect the power level.

Additionally, stereo audio signal weight detector 122c computes the "LpR" level of "L+R" audio signal and "LmR" level of "L−R" audio signal for evaluating stereo audio weight based on "L+R" audio signal and "L−R" audio signal of FM demodulator 30.

Finally, threshold operation unit 122e calculates the weight value, pilot level ratio, demodulated level and stereo audio weight of weight setting unit 122d to generate threshold signal. Thus, the threshold value can be adjusted on the basis of pilot level ratio, demodulated level and stereo audio weight.

The threshold value for noise determination can be different according to variant modes. As shown in FIG. 5, the threshold value can be adjusted based on demodulated level and stereo audio weight.

Moreover, as shown in FIG. 6, the hysteresis manner of threshold signal utilizes different threshold value when the status flag turns-on/turns-off for determining the noise exists.

Furthermore, the noise reduction control signal is generated if the shorter time interval is a predetermined interval when state changes during the shorter time interval with respect to the noise detection of the present invention, as shown in a confidence counter 122g of FIG. 7.

Figure 9:
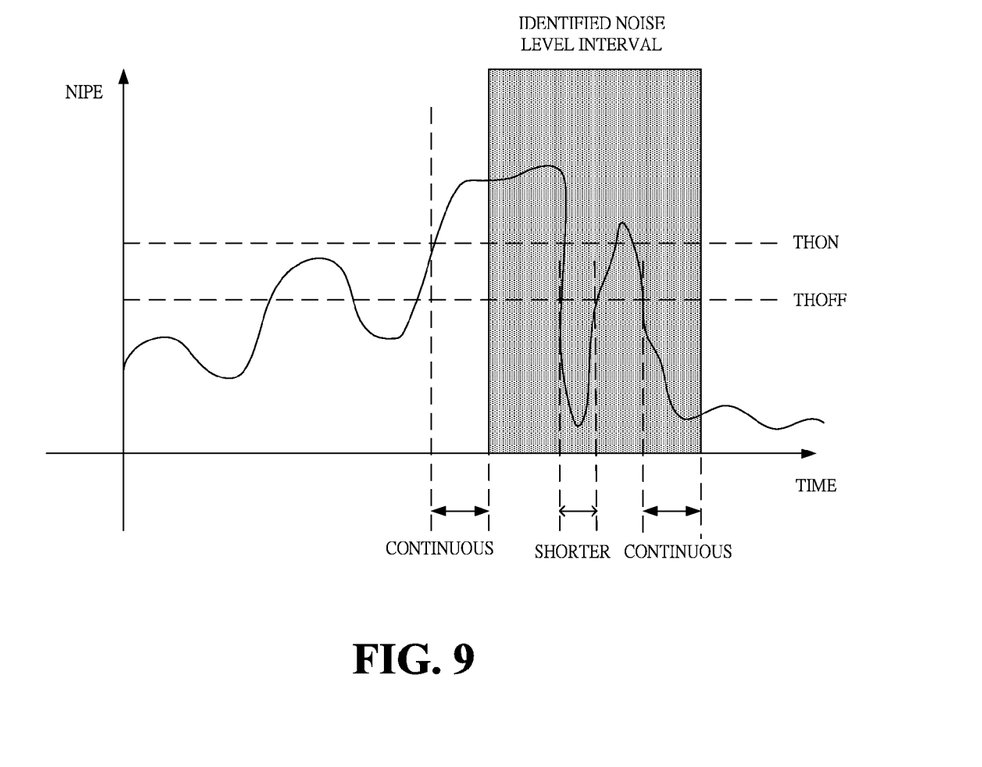
FIG. 9 illustrates a schematic view for identifying the noise characteristic in a continuous time interval according to one embodiment of the present invention.

FIG. 9 illustrates a schematic view for identifying the noise characteristic in a continuous time interval according to one embodiment of the present invention. As sown in FIG. 9, when NIPE is greater than first threshold signal (THON), noise exists. The confidence counter 122g counts the time of noise existence. When the time interval of noise existence is greater than a predetermined time interval, a noise reduction signal having an "ON" signal is outputted during the noise existence interval.

When the noise level lowers down to second threshold value (THOFF) within a time interval but the noise level instantly is raised to be higher than second threshold value (THOFF) after the time interval, the confidence counter 122g is operated. Because the noise level raises above the second threshold value (THOFF) within the time interval, it is regarded as a noise interval to keep the output of noise reduction control signal.

When the noise level lowers down to second threshold value (THOFF), which is greater than the time interval counted by the confidence counter 122g, a noise reduction signal having an "OFF" signal is outputted to be a status change. After the confidence counter 122g counts, the noise level is in a non-noise interval.

The threshold signal with hysteresis is used to determine whether noise exists in NIPE and noise reduction control signal is outputted due to status change for stably detecting noise and noise reduction control when time interval of the status change counted by the confidence counter 122g is greater than a predetermined time interval.

As the above-mentioned descriptions, when noise reduction controller 100 outputs noise reduction control signal, noise reduction 70 adopts stereo noise control mode for attenuating "L_R" audio signal to decrease audio noise, and high frequency cut mode for cutting high frequency portion to decrease audio noise. In addition, besides software can be used to attenuate audio noise in "L−R" signal or high frequency component, hard switch can be employed.

In comparison with conventional RSSI, the present invention is capable of detecting multi-path fading or the situations which RSSI cannot detects and thus reduces the noise in FM audio signal.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for audio noise reduction of frequency modulation (FM) receiver, wherein after receiving a FM signal having a pilot tone, a pilot carrier sync detector performs a pilot carrier synchronization detection of the FM signal, a FM demodulator demodulates the synchronized FM signal, a multiplex decoder decodes an audio signal of the demodulated FM signal for outputting the decoded audio signal, and a noise reduction controls the multiplex decoder for controlling noise attenuation associated with the decoded audio signal according to RSSI, the method comprising the steps of:
   (a) performing a phase error detection for detecting the phase error of phase-locked loop (PLL) of the pilot carrier sync detector;
   (b) determining whether noise exists by comparing the phase error with a threshold value to determine whether the noise exists in the phase error; and
   (c) performing a noise reduction step by outputting a noise reduction control signal to the noise reduction based on the determination in step (b) for reducing the noise in the noise existence interval.

2. The method of claim 1, during the step (b), further comprising detecting one of an absolute average value of the phase error, an absolute peak value of the phase error, an absolute average peak value of the phase error and power level of the phase error based on a noise detection mode, and comparing the detected phase error with the threshold value for determining whether the noise exists.

3. The method of claim 1, wherein during the step (c), the threshold value is processed by a hysteresis manner and when status flags of the noise reduction control signal turns on/off, a plurality of different threshold values are used in the status flags, respectively.

4. The method of claim 1, wherein during the step (c), when status flags of the noise reduction control signal turn on/off, a confidence counter allows the status flag to be changed during a predetermined continuous time interval.

5. The method of claim 1, wherein a pilot level ratio, a demodulated level and a stereo audio weight generated by detecting the FM demodulated signal of the FM demodulator are used to adjust the threshold value for noise detection.

6. The method of claim 1, wherein the threshold value is configured by following formula:

$$THNIPE = \alpha NIPE \times (\text{Pilot Level Ratio}) \times (\text{Demod Level} \times \text{Stereo Degree}), \text{Noise detection, when } NIPE >= THNIPE, \text{wherein}$$

$$LpR \text{ Level} = AVG\{abs(\text{"}L+R\text{" signal's FM demodulated output})\} \text{ or } AVG\{(\text{"}L+R\text{" signal's FM demodulated output})^2\};$$

$$LmR \text{ Level} = AVG\{abs(\text{"}L-R\text{" signal's FM demodulated output})\} \text{ or } AVG\{(\text{"}L-R\text{" signal's FM demodulated output})^2\};$$

$$\text{Pilot level ratio} = AVG\{abs(\text{Pilot signal's FM demodulated output})\} \text{ or } AVG\{(\text{Pilot signal's FM demodulated output})^2\};$$

$$\text{Demod Level} = AVG\{abs(\text{FM demodulator output})\} \text{ or } AVG\{(\text{demodulator output})^2\};$$

$$\alpha NIPE = \text{Pre-defined NIPE, weighting value};$$

Pilot Level Ratio=(Pilot Level)÷(*LpR* Level+*LmR* Level); and

Stereo Degree=(*LpR* Level+*LmR* Level)÷(*LpR* Level).

7. An apparatus for audio noise reduction of frequency modulation (FM) receiver, wherein after receiving a FM signal having a pilot tone, a pilot carrier sync detector performs a pilot carrier synchronization detection of the FM signal, a FM demodulator demodulates the synchronized FM signal, a multiplex decoder decodes an audio signal of the demodulated FM signal for outputting the decoded audio signal, and a noise reduction controls the multiplex decoder for controlling noise attenuation associated with the decoded audio signal according to RSSI, the apparatus comprising:
- a phase error, detecting the phase error of the PLL of the pilot carrier sync detector; and
- a noise reduction unit, outputting a noise reduction control signal to the noise reduction for reducing the noise in a noise existence interval.

8. The apparatus of claim 7, wherein the noise reduction unit further comprises:
- a NIPE detecting unit, generating noise indicator by phase error (NIPE) by computing one of a absolute value averaging operation unit of the phase error, a peak value operation unit of the phase error, a peak value averaging operation unit of the phase error, and a power level average and performing selection based on a noise detection mode;
- a threshold setting unit, configuring a threshold value for comparing the threshold value with the NIPE to determine whether the noise exists or not; and
- a noise detection unit, outputting a noise reduction control signal to the noise reduction unit after comparing the threshold value with the NIPE to determine whether the noise exists or not.

9. The apparatus of claim 8, wherein the NIPE detecting unit further comprises:
- an absolute value operation unit, computing the absolute value of the phase error detected by the PLL of the pilot carrier sync detector;
- an absolute value averaging operation unit, computing the output average of the absolute value operation unit;
- a peak value operation unit, computing the peak value of the absolute value operation unit during a predetermined time interval;
- a peak value averaging operation unit, computing the output average of the peak value operation unit;
- a power level operation unit, computing the squared phase error for forming the power level;
- a power level averaging operation unit, computing the average of the power level operation unit;
- a noise detection mode setting unit, configuring the noise detection mode by selecting one of absolute average value of the absolute value averaging operation unit, the peak value of the peak value operation unit, the absolute peak value of the peak value averaging operation unit, and the power level output of the phase error in the power level averaging operation unit; and
- a noise indication selection unit, selecting one of the absolute average value of the absolute value averaging operation unit, the peak value of the peak value operation unit, the absolute peak value of the peak value averaging operation unit, and the power level output of the phase error in power level averaging operation unit according to the noise detection mode by the noise detection mode setting unit to be served as the NIPE.

10. The apparatus of claim 8, wherein the threshold setting unit configures the threshold values as fixed value based on the noise detection modes, respectively.

11. The apparatus of claim 8, wherein the threshold setting unit further comprises:
- a pilot tone level ratio detector, detecting the pilot tone level ratio according to "L+R" audio signal, "L−R" audio signal and pilot tone level signal demodulated from the FM demodulator;
- a demodulated level detector, detecting the level of demodulated signal from the FM demodulator;
- a stereo audio signal weight detector, detecting the stereo audio weight based on the "L+R" audio signal, "L−R" audio signal from the FM demodulator;
- a weight setting unit, configuring weight value to facilitate noise reduction; and
- a threshold operation unit, computing the weight value, pilot tone level rate, demodulated signal level, and stereo audio weight for generating the threshold value and outputting the threshold signal to the noise detection unit.

12. The apparatus of claim 8, wherein the noise reduction controller further comprises a hysteresis control unit, comparing NIPE signal with the threshold signal by noise detection unit based on the based on threshold signal from the threshold setting unit to generate noise reduction control signal wherein the threshold value is further processed by hysteresis manner.

13. The apparatus of claim 12, wherein the noise reduction controller further comprises a confidence counter and when the noise detection unit generates the noise reduction control signal, the state of noise reduction control signal changes and the state change keeps in a predetermined time interval, the noise reduction control signal is generated.

14. The apparatus of claim 8, wherein the noise reduction controller further comprises a confidence counter and when the noise detection unit generates the noise reduction control signal, the state of noise reduction control signal changes and the state change keeps in a predetermined time interval, the noise reduction control signal is generated.

15. The apparatus of claim 8, wherein the noise reduction unit utilizes a setting mode for selecting one of SNC type, HCC type and Mute type and controls the turn on/off of the selected setting mode based on NIPE signal.

\* \* \* \* \*